(12) United States Patent
Sishtla et al.

(10) Patent No.: US 11,555,502 B1
(45) Date of Patent: Jan. 17, 2023

(54) COMPRESSOR INCLUDING INLET GUIDE VANES

(71) Applicant: CARRIER CORPORATION, Palm Beach Gardens, FL (US)

(72) Inventors: Vishnu M. Sishtla, Syracuse, NY (US); Chaitanya Vishwajit Halbe, New Haven, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/401,528

(22) Filed: Aug. 13, 2021

(51) Int. Cl.
| | |
|---|---|
| *F04D 27/00* | (2006.01) |
| *F02C 6/12* | (2006.01) |
| *F04D 29/56* | (2006.01) |
| *F04D 27/02* | (2006.01) |
| *F04D 29/46* | (2006.01) |
| *F02C 7/042* | (2006.01) |
| *F04D 15/00* | (2006.01) |
| *F04D 29/42* | (2006.01) |

(52) U.S. Cl.
CPC .............. *F04D 27/002* (2013.01); *F02C 6/12* (2013.01); *F02C 7/042* (2013.01); *F04D 15/0022* (2013.01); *F04D 27/0246* (2013.01); *F04D 27/0253* (2013.01); *F04D 29/4213* (2013.01); *F04D 29/464* (2013.01); *F04D 29/563* (2013.01); *F05D 2240/12* (2013.01); *F05D 2250/51* (2013.01); *F05D 2270/101* (2013.01)

(58) Field of Classification Search
CPC .............. F04D 27/002; F04D 15/0022; F04D 27/0246; F04D 27/0253; F04D 29/4213; F04D 29/464; F04D 29/563; F02C 6/12; F02C 7/042; F05D 2240/12; F05D 2250/51; F05D 2270/101
See application file for complete search history.

(56) References Cited

U.S. PATENT DOCUMENTS

| | | | | |
|---|---|---|---|---|
| 4,187,879 | A * | 2/1980 | Fermer | F04D 27/002 137/601.07 |
| 10,851,705 | B1 * | 12/2020 | Avola | F02C 6/12 |
| 2011/0194904 | A1 * | 8/2011 | Carlson | F04D 29/462 417/307 |
| 2015/0192133 | A1 * | 7/2015 | An | F04D 29/4213 415/203 |
| 2015/0377250 | A1 * | 12/2015 | Sishtla | F04D 27/0246 415/191 |
| 2019/0078587 | A1 * | 3/2019 | Zeng | F04D 27/002 |
| 2020/0011196 | A1 * | 1/2020 | Karstadt | F16K 3/03 |

* cited by examiner

*Primary Examiner* — Juan G Flores
*Assistant Examiner* — Brian Christopher Delrue
(74) *Attorney, Agent, or Firm* — Carlson, Gaskey & Olds, P.C.

(57) ABSTRACT

An illustrative example embodiment of a compressor includes an inlet defining an intake passage, a plurality of lateral inlet guide vanes in the intake passage, and a plurality of medial inlet guide vanes in the intake passage. The lateral guide vanes are selectively oriented to alter an amount of fluid flow through a first, lateral portion of the intake passage. The medial inlet guide vanes are selectively oriented to alter an amount of fluid flow through a second, medial portion of the intake passage.

18 Claims, 2 Drawing Sheets

COMPRESSOR INCLUDING INLET GUIDE VANES

BACKGROUND

Compressors are used for a variety of purposes when pressurized fluid or gas is needed. For example, refrigerant circuits utilize pressurized refrigerant to achieve cooling for refrigeration or air conditioning. A variety of compressor configurations have been used in refrigerant circuits.

One challenge associated with some compressors is achieving optimum efficiency during a variety of operating conditions. For example, the compressor may not need to operate at full capacity under so-called part-load conditions. It would be useful to avoid aerodynamic losses in the impeller under such conditions because such losses negatively affect the compressor efficiency and surge margin.

SUMMARY

An illustrative example embodiment of a compressor includes an inlet defining an intake passage, a plurality of lateral inlet guide vanes in the intake passage, and a plurality of medial inlet guide vanes in the intake passage. The lateral guide vanes are selectively oriented to alter an amount of fluid flow through a first, lateral portion of the intake passage. The medial inlet guide vanes are selectively oriented to alter an amount of fluid flow through a second, medial portion of the intake passage.

In addition to one or more of the features described above, or as an alternative, the plurality of lateral inlet guide vanes surrounds the plurality of medial inlet guide vanes.

In addition to one or more of the features described above, or as an alternative, at least one controller is configured to control an orientation of the lateral inlet guide vanes and an orientation of the medial inlet guide vanes.

In addition to one or more of the features described above, or as an alternative, the at least one controller selectively causes the orientation of the lateral inlet guide vanes to be different than the orientation of the medial inlet guide vanes.

In addition to one or more of the features described above, or as an alternative, an impeller is downstream of the inlet guide vanes. The impeller includes a plurality of blades each having a leading edge between a hub and an outer end of the impeller. The controller selectively controls the respective orientations of the lateral inlet guide vanes and the medial inlet guide vanes to direct fluid toward the leading edges at an angle of incidence that varies along the leading edges.

In addition to one or more of the features described above, or as an alternative, the controller controls the orientation of the lateral inlet guide vanes such that fluid encounters lateral portions of the leading edges of the blades at a first angle of incidence and the controller controls the orientation of the medial inlet guide vanes such that fluid encounters medial portions of the leading edges of the blades at a second, different angle of incidence.

In addition to one or more of the features described above, or as an alternative, the controller determines an operating condition of the compressor and controls the orientations of the inlet guide vanes based on the determined operating condition.

In addition to one or more of the features described above, or as an alternative, the lateral and medial inlet guide vanes are each rotatable about a respective vane axis that is transverse to a primary direction of fluid flow through the intake passage and an orientation of each inlet vane about the respective vane axis affects at least one characteristic of fluid flow downstream of the inlet vane in the intake passage.

In addition to one or more of the features described above, or as an alternative, the orientation of each inlet vane is individually controllable.

In addition to one or more of the features described above, or as an alternative, the lateral inlet guide vanes and the medial inlet guide vanes are situated at a common longitudinal location in the inlet.

In addition to one or more of the features described above, or as an alternative, the lateral inlet guide vanes are each rotatable about a respective vane axis that is transverse to a primary direction of fluid flow in the intake passage. The medial inlet guide vanes are each rotatable about a respective vane axis that is transverse to the primary direction of fluid flow and the axes of at least some of the lateral inlet guide vanes are colinear with the axes of at least some of the lateral inlet guide vanes.

In addition to one or more of the features described above, or as an alternative, the compressor includes at least one actuator, each of the at least some of the lateral inlet guide vanes includes a tube aligned with the axis of the vane, each of the at least some of the medial inlet guide vanes includes a rod aligned with the axis of the vane, each rod is at least partially received in an aligned one of the tubes, the at least one actuator is configured to selectively rotate the rod of a selected medial inlet guide vane to change an orientation of the selected medial guide vane, and the at least one actuator is configured to selectively rotate the tube of a selected lateral inlet guide vane to change an orientation of the selected lateral guide vane.

In addition to one or more of the features described above, or as an alternative, the at least one actuator is configured to selectively rotate each of the tubes independently of the rod received in the tube to independently change the orientation of the associated lateral inlet guide vane and the orientation of the associated medial inlet guide vane.

In addition to one or more of the features described above, or as an alternative, the lateral inlet guide vanes occupy a first cross-sectional area of the intake passage and the medial inlet guide vanes occupy a second cross-sectional area of the intake passage.

In addition to one or more of the features described above, or as an alternative, the first cross-sectional area is different than the second cross-sectional area.

The various features and advantages of at least one disclosed example embodiment will become apparent to those skilled in the art from the following detailed description. The drawings that accompany the detailed description can be briefly described as follows.

DETAILED DESCRIPTION

Figure 1:
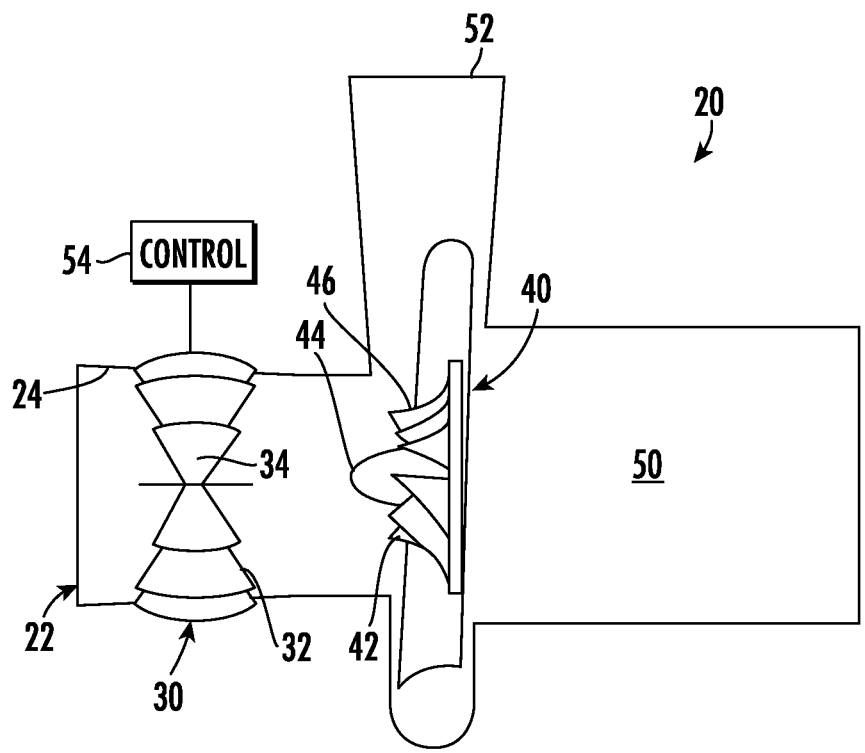
FIG. 1 schematically illustrates an example embodiment of a compressor including a plurality of lateral inlet guide vanes and a plurality of medial inlet guide vanes.
Figure 2:
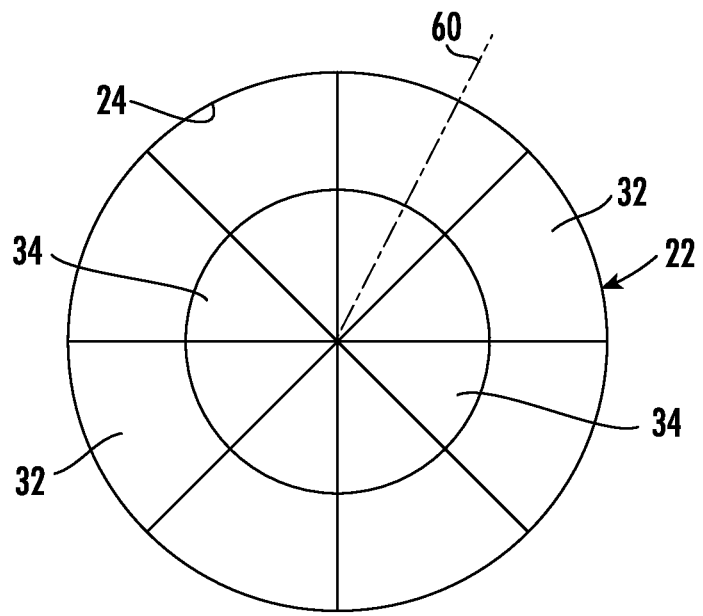
FIG. 2 is an end view schematically illustrating an arrangement of lateral and medial inlet guide vanes according to an example embodiment.
Figure 3:
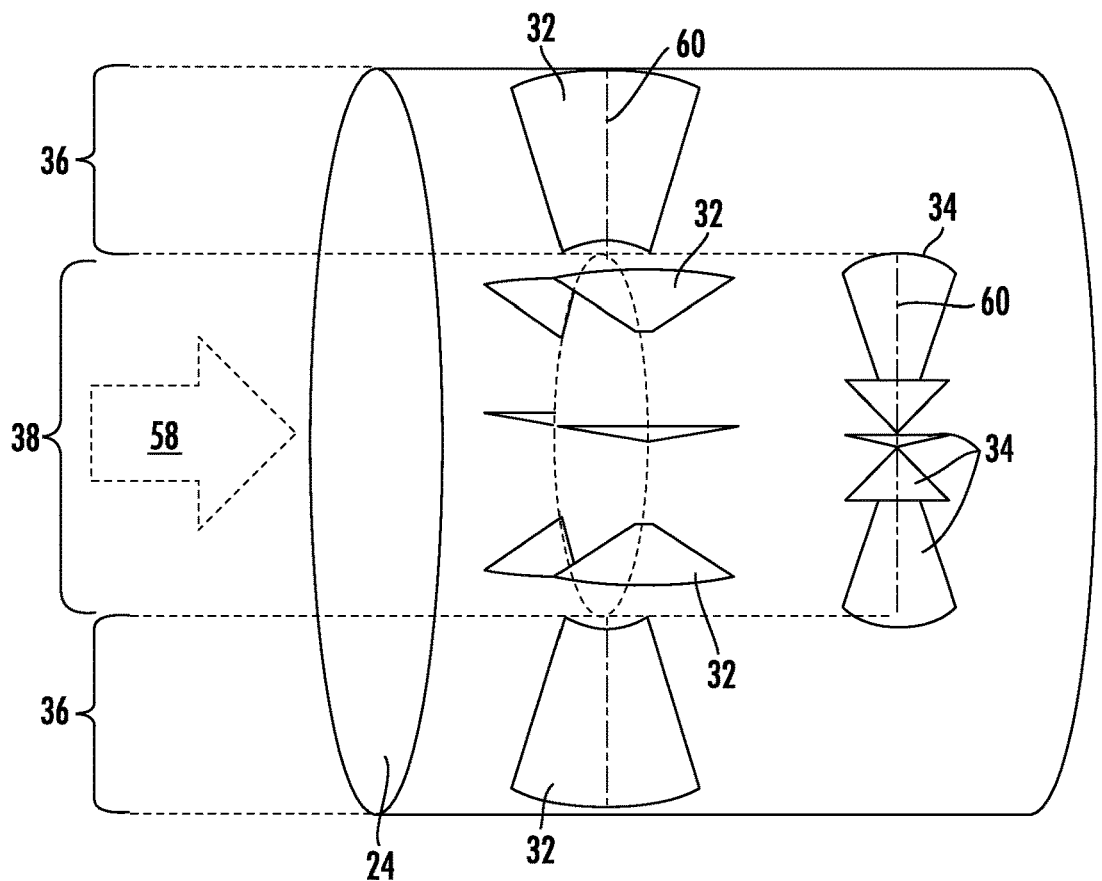
FIG. 3 is a perspective, partially exploded view schematically illustrating selected portions of the compressor shown in FIG. 1.

FIGS. 1-3 schematically illustrate selected features of an example embodiment of a compressor 20. An inlet 22 defines an intake passage 24. A set of inlet guide vanes 30 are situated within the intake passage 24 to control fluid flow through the intake passage 24. The inlet guide vanes 30 include a plurality of first inlet guide vanes 32 and a plurality of second inlet guide vanes 34.

The first inlet guide vanes 32 are situated in a lateral portion 36 of the intake passage 24 and are referred to as lateral inlet guide vanes 32 in the rest of this description. The lateral inlet guide vanes 32 are configured to selectively alter at least one characteristic of fluid flow through the lateral portion 36 of the intake passage 24.

The second inlet guide vanes 34 are situated in a medial portion 38 of the intake passage 24 and are referred to as medial inlet guide vanes 34 in the rest of this description. The medial inlet guide vanes 34 are configured to selectively alter at least one characteristic of fluid flow through the medial portion 38 of the intake passage 24.

The compressor 20 includes an impeller 40 having a plurality of impeller blades 42. Leading edges of the impeller blades 42 extend in a spanwise manner between a hub 44 and an outer shroud 46 of the impeller 40.

A drive portion 50, which includes a motor and a gear arrangement in some embodiments, drives the impeller 40 to move fluid from the intake passage 24 to an outlet 52 of the compressor 20.

A controller 54 is configured to control an orientation of the lateral inlet guide vanes 32 and the medial inlet guide vanes 34. The orientation of the respective inlet guide vanes 32, 34 affects at least one characteristic of fluid flow through the corresponding portion of the intake passage 24. The controller 54 includes a computing device, such as a processor and associated memory, that is suitably programmed to selectively vary the orientation of the inlet guide vanes 32, 34 to achieve desired fluid flow characteristics for different compressor operating conditions. The controller 54 is configured to control the respective orientations of the pluralities of inlet guide vanes 32, 34 so that, under at least some compressor operating conditions, the lateral inlet guide vanes 32 have a different orientation than the orientation of the medial inlet guide vanes 34. For example, when operating at part load, the lateral inlet guide vanes 32 may be closed to a greater degree than the medial inlet guide vanes 34, and conversely, when operating at full load, both the lateral inlet guide vanes 32 and the medial inlet guide vanes 34 may be fully open. Controlling the inlet guide vanes 32, 34 to have different orientations provides different characteristics of fluid flow, such as swirl, through the different portions of the intake passage 24. The combined effect of the fluid flow through the medial and lateral portions of the intake passage 24 achieves a desired flow characteristic downstream of the inlet guide vanes 32, 34.

Different flow characteristics, such as swirl, through the different portions of the intake passage 24 allows for varying the incidence angle at which the fluid downstream of the inlet guide vanes 32, 34 encounters the leading edges of the impeller blades 42. Utilizing more than one plurality of inlet guide vanes that are selectively controlled to have different orientations makes it possible to achieve a desired incidence angle at different spanwise locations along the leading edges of the impeller blades 42. Controlling the incidence angle in this way increases or improves compressor performance, such as efficiency and surge margin.

As best appreciated from FIGS. 2 and 3, the intake passage 24 in the illustrated example embodiment has a circular cross-section. The medial portion 38 of the intake passage 24 also has a circular cross-section and is located at a center of the intake passage 24. The lateral portion 36 of the intake passage 24 occupies the ring-shaped cross-sectional area between the outside edge or perimeter of the intake passage 24 and the outer edge of the medial portion 38.

FIG. 2 schematically shows all of the inlet guide vanes 32, 34 in an orientation that would effectively close off the intake passage 24. FIG. 3 shows the inlet guide vanes 32, 34 in a fully open position that would allow the maximum amount of fluid flow, which follows a primary direction through the intake passage 24 schematically represented by the arrow 58. The controller 54 selectively varies the orientations of the inlet guide vanes 32, 34 between the positions schematically shown in FIGS. 2 and 3 to accommodate the different desired characteristics of fluid flow through the intake passage 24 for a current or expected operating condition of the compressor 20.

In the illustrated example embodiment, the inlet guide vanes 32, 34 are supported to the rotatable about an axis 60 that extends in a radial direction transverse to the primary direction of fluid flow 58 through the intake passage 24. In this example, each of the medial inlet guide vanes 34 is aligned with one of the lateral inlet guide vanes 32 such that the axis 60 of each medial inlet guide vane 34 is collinear with the axis 60 of the aligned one of the lateral inlet guide vanes 34.

Figure 4:
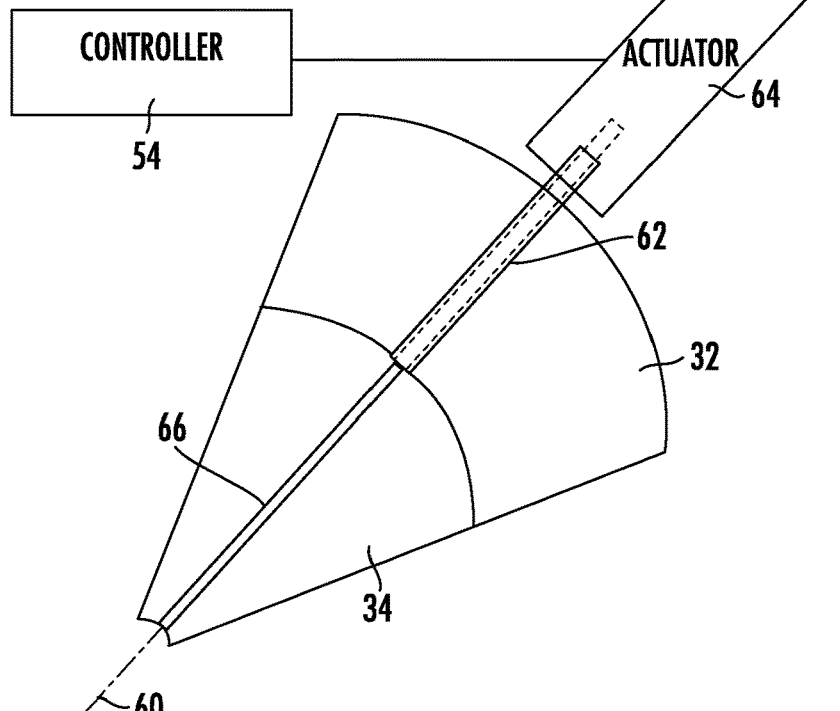
FIG. 4 schematically illustrates an example configuration of components configured to adjust an orientation of lateral and medial inlet guide vanes.

Having the axes 60 aligned as schematically shown in FIG. 2 allows for supporting and selectively orienting the inlet guide vanes 32, 34 in a manner as schematically shown in FIG. 4. In this illustrated example embodiment, each lateral inlet guide vane 32 has an associated tube or sleeve 62 that the lateral inlet guide 32 is supported on or secured to in a manner that rotation of the tube or sleeve 62 about the axis 60 causes corresponding rotation of the lateral inlet guide vane 32. An actuator 64, which may include an electric motor for example, responds to commands from the controller 54 to selectively rotate the tube or sleeve 62 for changing the orientation of the lateral inlet guide vane 32 relative to the primary direction of fluid flow 58 (FIG. 3) or the longitudinal axis of the intake passage 24.

A rod 66, which is at least partially received through the tube or sleeve 62, is associated with the aligned medial inlet guide vane 34. The rod 66 supports or is secured to the medial inlet guide vane 34 in a manner such that rotation of the rod 66 causes corresponding movement of the medial inlet guide vane 34 for changing the orientation of the medial inlet guide vane 34.

In the example of FIG. 4, the actuator 64 selectively and independently causes rotation of the tube or sleeve 62 and the rod 66 based upon commands from the controller 54. By individually rotating the tube or sleeve 62 and the rod 66, the actuator 64 achieves a selected orientation of the corresponding inlet guide vanes 32, 34, respectively, based upon commands from the controller 54.

In some embodiments, the single actuator 64 includes a clutch mechanism that selectively engages the tube or sleeve 62 independently of the rod 66 so that the single actuator 64 can independently change the orientation of the lateral inlet guide vane 32 and the medial inlet guide vane 34, respectively. Other embodiments include independent or separate actuators dedicated to each of the tube or sleeve 62 and the rod 66.

Although only one lateral inlet guide vane 32 and only one medial inlet guide vane 34 are shown in FIG. 4, the same arrangement is provided for each of the inlet guide vanes for selectively controlling the orientation of every inlet guide vane within the set 30.

Having a plurality of first, lateral inlet guide vanes 32 that are selectively controlled to be in a desired orientation for controlling at least one characteristic of fluid flow through a first, lateral portion of a compressor intake passage and a plurality of second, medial inlet guide vanes 34 for controlling at least one characteristic of fluid flow through a second, medial portion of that intake passage 24 allows for improving compressor performance by achieving different incidence angles along different spanwise portions of the leading edges of the impeller blades 42. Controlling fluid flow using multiple pluralities of inlet guide vanes situated for controlling fluid flow through different portions of the intake passage 24 achieves better compressor performance under a wider variety of operating conditions, especially part load conditions in which compressor performance or efficiency may otherwise be compromised.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A compressor, comprising:
   an inlet defining an intake passage;
   a plurality of lateral inlet guide vanes situated in a lateral portion of the intake passage, the lateral inlet guide vanes being configured to selectively alter at least one characteristic of fluid flow through the lateral portion of the intake passage; and
   a plurality of medial inlet guide vanes situated in a medial portion of the intake passage, the medial inlet guide vanes being configured to selectively alter at least one characteristic of fluid flow through the medial portion of the intake passage independently of the plurality of lateral inlet guide vanes.

2. The compressor of claim 1, wherein the plurality of lateral inlet guide vanes surrounds the plurality of medial inlet guide vanes.

3. The compressor of claim 1, wherein
   the lateral and medial inlet guide vanes are each rotatable about a respective vane axis that is transverse to a primary direction of fluid flow through the intake passage, and
   an orientation of each inlet vane about the respective vane axis affects at least one characteristic of fluid flow downstream of the inlet vane in the intake passage.

4. The compressor of claim 3, wherein the orientation of each inlet vane is individually controllable.

5. The compressor of claim 1, wherein the lateral inlet guide vanes and the medial inlet guide vanes are situated at a common longitudinal location in the inlet.

6. The compressor of claim 5, wherein
   the lateral inlet guide vanes are each rotatable about a respective vane axis that is transverse to a primary direction of fluid flow in the intake passage,
   the medial inlet guide vanes are each rotatable about a respective vane axis that is transverse to the primary direction of fluid flow, and
   the axes of at least some of the lateral inlet guide vanes are colinear with the axes of at least some of the medial inlet guide vanes.

7. The compressor of claim 6, comprising at least one actuator and wherein
   each of the at least some of the lateral inlet guide vanes includes a tube aligned with the axis of the vane,
   each of the at least some of the medial inlet guide vanes includes a rod aligned with the axis of the vane,
   each rod is at least partially received in one of the tubes,
   the at least one actuator is configured to selectively rotate the rod of a selected medial inlet guide vane to change an orientation of the selected medial inlet guide vane, and
   the at least one actuator is configured to selectively rotate the tube of a selected lateral inlet guide vane to change an orientation of the selected lateral inlet guide vane.

8. The compressor of claim 7, wherein the at least one actuator is configured to selectively rotate each of the tubes independently of the rod received in the tube to independently change the orientation of the associated lateral inlet guide vane and the orientation of the associated medial inlet guide vane.

9. The compressor of claim 1, wherein
   the lateral inlet guide vanes occupy a first cross-sectional area of the intake passage, and
   the medial inlet guide vanes occupy a second cross-sectional area of the intake passage.

10. The compressor of claim 9, wherein the first cross-sectional area is different than the second cross-sectional area.

11. The compressor of claim 1, comprising at least one controller configured to control an orientation of the lateral inlet guide vanes and an orientation of the medial inlet guide vanes.

12. The compressor of claim 11, wherein the at least one controller selectively causes the orientation of the lateral inlet guide vanes to be different than the orientation of the medial inlet guide vanes.

13. The compressor of claim 11, comprising an impeller downstream of the inlet guide vanes and wherein
   the impeller includes a plurality of blades each having a leading edge between a hub and an outer end of the impeller; and
   the controller selectively controls the respective orientations of the lateral inlet guide vanes and the medial inlet guide vanes to direct fluid toward the leading edges at an angle of incidence that varies along the leading edges.

14. The compressor of claim 13, wherein
   the controller controls the orientation of the lateral inlet guide vanes such that fluid encounters lateral portions of the leading edges of the blades at a first angle of incidence, and
   the controller controls the orientation of the medial inlet guide vanes such that fluid encounters medial portions of the leading edges of the blades at a second, different angle of incidence.

15. The compressor of claim 11, wherein the controller determines an operating condition of the compressor and controls the orientations of the inlet guide vanes based on the determined operating condition.

16. A compressor, comprising:
   an inlet defining an intake passage;
   a plurality of lateral inlet guide vanes situated in a lateral portion of the intake passage, the lateral inlet guide vanes being configured to selectively alter at least one characteristic of fluid flow through the lateral portion of the intake passage; and a plurality of medial inlet guide vanes situated in a medial portion of the intake passage, the medial inlet guide vanes being configured to selectively alter at least one characteristic of fluid flow through the medial portion of the intake passage, wherein the lateral and medial inlet guide vanes are each rotatable about a respective vane axis that is transverse to a primary direction of fluid flow through the intake passage, an orientation of each inlet vane about the respective vane axis affects at least one characteristic of fluid flow downstream of the inlet vane in the intake passage, and the orientation of each inlet vane is individually controllable.

17. A compressor, comprising:

an inlet defining an intake passage;

a plurality of lateral inlet guide vanes situated in a lateral portion of the intake passage, the lateral inlet guide vanes being configured to selectively alter at least one characteristic of fluid flow through the lateral portion of the intake passage;

a plurality of medial inlet guide vanes situated in a medial portion of the intake passage, the medial inlet guide vanes being configured to selectively alter at least one characteristic of fluid flow through the medial portion of the intake passage; and at least one actuator, wherein the lateral inlet guide vanes and the medial inlet guide vanes are situated at a common longitudinal location in the inlet, the lateral inlet guide vanes are each rotatable about a respective vane axis that is transverse to a primary direction of fluid flow in the intake passage, the medial inlet guide vanes are each rotatable about a respective vane axis that is transverse to the primary direction of fluid flow, the axes of at least some of the lateral inlet guide vanes are colinear with the axes of at least some of the lateral inlet guide vanes, each of the at least some of the lateral inlet guide vanes includes a tube aligned with the axis of the vane, each of the at least some of the medial inlet guide vanes includes a rod aligned with the axis of the vane, each rod is at least partially received in one of the tubes, the at least one actuator is configured to selectively rotate the rod of a selected medial inlet guide vane to change an orientation of the selected medial inlet guide vane, and the at least one actuator is configured to selectively rotate the tube of a selected lateral inlet guide vane to change an orientation of the selected lateral inlet guide vane.

18. The compressor of claim 17, wherein the at least one actuator is configured to selectively rotate each of the tubes independently of the rod received in the tube to independently change the orientation of the associated lateral inlet guide vane and the orientation of the associated medial inlet guide vane.

* * * * *